United States Patent [19]

Turner

[11] Patent Number: 5,229,991
[45] Date of Patent: Jul. 20, 1993

[54] PACKET SWITCH WITH BROADCASTING CAPABILITY FOR ATM NETWORKS

[75] Inventor: Jonathan S. Turner, St. Louis, Mo.

[73] Assignee: Washington University, St. Louis, Mo.

[21] Appl. No.: 647,808

[22] Filed: Jan. 30, 1991

[51] Int. Cl.$^5$ .............................................. H04J 3/26
[52] U.S. Cl. ..................................... 370/60; 370/94.1
[58] Field of Search ...................... 370/94.1, 85.12, 60, 370/105.3, 60.1, 62, 94.2, 94.3

[56] References Cited

U.S. PATENT DOCUMENTS

| | | |
|---|---|---|
| 4,516,238 | 5/1985 | Huang et al. |
| 4,596,010 | 6/1986 | Beckner ............................. 370/60 |
| 4,849,968 | 7/1989 | Turner. |
| 4,969,146 | 11/1990 | Twitty ............................. 370/85.1 |
| 4,991,168 | 2/1991 | Richards ............................. 370/58.1 |
| 5,007,070 | 4/1991 | Chao ............................. 370/105.3 |
| 5,050,164 | 9/1991 | Chao ............................. 370/85.12 |

OTHER PUBLICATIONS

Article entitled "Nonblocking Copy Networks for Multicast Packet Switching" by Lee published in the *IEEE Journal on Selected Areas in Communications*, vol. 6, No. 9, Dec. 1988.
Article entitled "Starlite: A Wideband Digital Switch" by Huang et al. published in *Proceedings of Globecom 84*, Dec. 1984, 121-125.
Article entitled "Fast Packet Switch Architectures for Broadband Integrated Services Digital Networks" by Tobagi published in *IEEE*, 1990, 134-167.
Article entitled "Design of a Broadcast Packet Switching Network" by Turner published in *IEEE Transactions on Communications*, vol. 36, No. 6, Jun. 1988, 734-743.
Article entitled "Output-buffer Switch Architecture for Asynchronous Transfer Mode" by Suzuki et al. published in *IEEE*, 1989, 99-103.

Primary Examiner—Douglas W. Olms
Assistant Examiner—Melvin Marcelo
Attorney, Agent, or Firm—Rogers, Howell & Haferkamp

[57] ABSTRACT

A packet switch having broadcasting capability for an ATM network includes a copy network stage having an increased number of copy outputs over the number of switch inputs and outputs to improve data throughput under worst case conditions, broadcast translation circuits with inputs connected to a multiple number of copy network outputs for multiplexing the data packets therethrough, partitioned memories for the broadcast translation circuits to reduce their memory requirements, and techniques for aligning broadcast copies of data packets for minimizing the number of copies each BTC must translate and thereby reduce each of their memories. All of these enhancements to a prior art broadcast ATM switch substantially reduce its memory requirements to thereby enable broadcasting in an ATM switch to be practically realized.

25 Claims, 5 Drawing Sheets

PACKET SWITCH WITH BROADCASTING CAPABILITY FOR ATM NETWORKS

GOVERNMENT RIGHTS

This invention was made with Government support under Grant No. NCR 8914396 awarded by the National Science Foundation. The Government has certain rights in the invention.

BACKGROUND AND SUMMARY OF THE INVENTION

Much work has been done on developing switching systems for asynchronous transfer mode (ATM) or fast packet networks with particular application in the distribution of video and other high speed information streams. In particular, a prior art publication describes a head end circuit for a point-to-point switch which provides broadcast capability. By broadcasting is meant the capability of producing multiple copies of a single packet of data, assigning a virtual address for each of those copies, and outputting those multiple copies through a point-to-point switch for distribution to a multiple number of desired locations. In the proposed scheme, packets are first received at packet processors where they are assigned a fanout (number of copies) and a broadcast address. The packets then pass through a concentrator network which places the packets on consecutive outputs so as to ensure non-blocking operation in the subsequent networks of the switch. Next, the packets pass through a running adder network which computes the sum of the fanouts for all packets entering the network and places this running total in a field of each of the packets. Following the running adder, the packets enter a set of dummy address encoders (DACs) which perform two functions. First, the DACs determine which packets can be processed without exceeding the capability of the network by assigning outputs to each of the packets in turn. When an output is computed which exceeds the capacity of the network, the packet is discarded and the DACs return an acknowledgement to the sending input for each packet that is not discarded indicating their transmittal. Discarded packets are retransmitted at a later time. For the packets that are not discarded, the outputs are inserted into fields in the packet and the packets are then sent to a copy network. It is of particular note that in the prior art proposal, the copy network includes a number of inputs (n) and outputs (n) which are equivalent to the number (n) of switch inputs and outputs. The copy network creates and sends copies of each packet received, in the number called for, to their assigned outputs. The copy network also labels each copy with a copy number so that as each copy reaches the next stage of broadcast translator circuits (BTCs) its broadcast channel number (BCN) and copy number are translated into an output address that the point-to-point switch uses to guide the packet to its ultimate destination. Thus, at least theoretically, this prior art proposal suggests a scheme for adding broadcasting to a point-to-point switching fabric for use in an ATM network.

One of the problems encountered in implementing this prior art proposal for adding broadcasting is the inordinate size of the memory required for each BTC, and the head end as a whole. In the prior art proposal, there is the potential for a packet having any copy number to appear at any of the outputs of the copy network and, thusly, be routed to any of the BTCs. Thus, each BTC must have translation information for all copies in all broadcast configurations. For example, with a 256 port system with bit serial data paths and 128 signal pins per chip, 62 chips is enough for the concentrator, adder, DACs, and copy network. However, assuming 65K broadcast connections and 16 bits of translation information, then each BTC requires 250 megabits of memory. As there are 256 BTCs, that translates to 64 gigabits of total memory required for implementing the prior art proposal. The required memory thus makes the prior art proposal incapable of being physically implemented in view of existing chip and VLSI technology.

Still another problem encountered in implementing the prior art proposal is the potential of worst case data throughput. Because of the way that copying is managed, a single packet with a large fanout (for example n) can prevent most other packets that enter during a given cycle from passing through the network. For example, suppose the first input of the network receives a packet with a fanout of one and the second input receives a packet with a fanout of n, where n is the number of inputs to the broadcast switch. In this example, only the first packet with a fanout of one passes through the DACs and all other packets are blocked. This is because the DACs sense that the second packet, the packet with a fanout of n, exceeds the capacity of the copy network in that the first packet with a fanout of one leaves only n−1 copy network inputs available. Thus, the DACs discard the second packet and all subsequent packets in this cycle. In this worst case scenario, the DACs could pass just a single packet with a fanout of one in that particular cycle. While this is admittedly a worst case situation, it is certainly not so far-fetched that it can be easily ignored and, in some circumstances, would significantly reduce the throughput capability of the switch.

In addressing these various limitations in implementing a practical application of the prior art proposal, the inventor herein has succeeded in designing and developing various improvements to this prior art proposal which renders it capable of practical realization while minimizing or eliminating the various shortcomings mentioned above. A first modification includes the concept of expanding the capacity of the copy network. This can be achieved in either of two schemes. The first of these would be to provide two (or more) parallel switch planes (head ends) or just parallel copy networks and the second would be to merely provide a copy network having an increased number of outputs while maintaining the same number of inputs as there are ports for the switch itself. With the parallel switch plane or copy network version, packets having a fanout greater than one are copied to both networks, with each copy having half the fanout of the original. Network operation would otherwise proceed exactly as is described above. However, with each packet having a maximum fanout of at most n/2, a packet having a large fanout can cause itself and other packets to be discarded only if the packets on the prior inputs have a total fanout of more than n/2. (This presumes that each of the two parallel copy networks have n inputs/outputs.) Consequently, the pair of copy networks is guaranteed to output a minimum of n packets. Hence, even in the worst case data traffic pattern which produces the blocking as described above, a minimum of n packets is passed by the DACs through the copy network to the BTCs for translation. This improvement eliminates the worst case throughput analysis of the prior art proposal which limits throughput to one single copy packet per cycle.

The next set of improvements are directed to minimizing the overly large memory requirements for the BTCs. A first one of these improvements is to recognize that with typical data requirements for ATMs with a cell size of 424 bits, serial data paths, and a clock rate of nominally 100 MHz, each BTC can be shared by a large number of outputs sequentially with no observable delay in processing. For example, with 32 copy network outputs accessing a BTC sequentially, there is over 130 nanoseconds available for each memory access which is sufficiently long even for high density memory chips. To implement this improvement, multiple copy network outputs may simply be connected to multiple inputs of a single BTC, and some sequencing means be provided for converting the data packets from parallel to serial and vice versa.

Another improvement which results in reduced memory for the BTCs is to recognize that the throughput capability of the network limits the possible combinations of packets having a fanout greater than a critical fanout of $f_1$. Connections with fanout no larger than $f_1$ (the small fanout connections) require less translation data than those with fanout larger than $f_1$ (the large fanout connections). In addition, a smaller number of large fanout connections can be provided, since the number of switch outputs places a natural limit on the possible number of large fanout connections. Therefore, each BTC may have a memory partitioned into two parts with one each for small fanout connections and large fanout connections. The memory space thus required for each BTC is significantly reduced over that which would be required to store all possibilities for all fanout connections. With no other considerations, a critical fanout of $f1 = \sqrt{n}$ provides the greatest memory saving with this improvement.

Still another improvement which results in decreased memory requirements for the BTCs involves aligning the fanout addresses with the DACs. This technique results in each BTC only being required to translate specific (and fewer than all) copy numbers by aligning each packet's copies along certain copy network outputs. The DACs are used to generate these aligned addresses so that the packets which are accepted for transmission are tagged with the correct copy network outputs on which the specific copies are to appear. By aligning the fanout of each packet in this manner, each BTC can be assured of receiving packets for translation with only a certain set of copy numbers. This improvement works particularly well with the previously described concept of BTC sharing of copy network outputs as implementation of that improvement provides for multiple copy network outputs to be connected to each BTC. Therefore, by spacing the copy network outputs which are connected to each BTC, fanout aligned addressing will route only certain copy numbers to each BTC for each translation. While this scheme does result in what might first be viewed as a wasting of copy network capability, the savings experienced by memory reduction in the BTCs more than makes up for the increased copy network requirements to result in an overall significant savings in chip count.

While the principal advantages and features of the subject invention have been explained above, a more thorough understanding may be gained by referring to the drawings and description of the preferred embodiment which follow.

DETAILED DESCRIPTION OF THE PREFERRED EMBODIMENT

Figure 1:
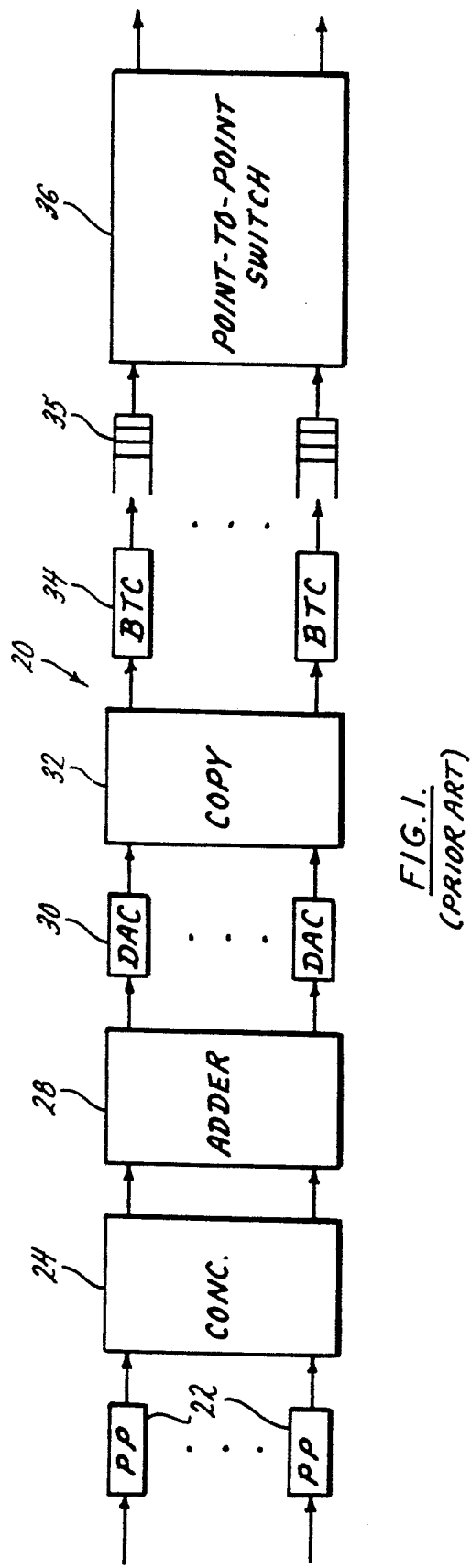
FIG. 1 is a block diagram of a prior art proposal for adding broadcasting to the front end of a point-to-point switch in an ATM switching network.
Figure 2:
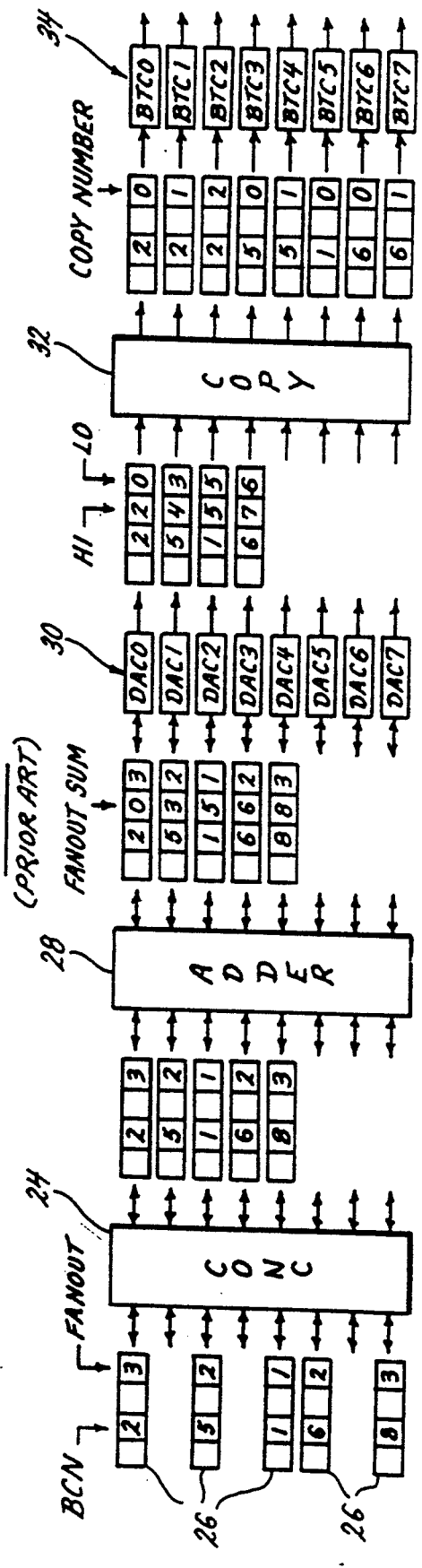
FIG. 2 is a block diagram of the same prior art proposal of FIG. 1 with further detail added to show an example of packet processing.

The prior art circuit 20 is shown in FIGS. 1 and 2 and includes a plurality of packet processors 22 which receive packets of data and present them in an orderly fashion to a concentrator network 24. As shown in FIG. 2, the concentrator network 24 takes the individual packets of data 26 which may appear on different input lines and "concentrates" them in an orderly manner and along the lowest numbered output lines to adder 28. Incidentally, as noted in the figures, each packet of data has a broadcast channel number (BCN) and a fanout, the fanout being the number of copies desired to be replicated and transmitted to different virtual addresses.

The adder 28 computes the total fanout F or cumulative fanout of all of the packets on lower numbered outputs and inserts the cumulative fanout in a data field in each packet. For example, as shown in FIG. 2, the cumulative fanout for the first data packet is, of course, 0 as there are no packets appearing on lower numbered data lines. The next data packet has a cumulative fanout of 3 which is the fanout for the preceding packet. The next data packet has a cumulative fanout of 5 which represents the previous cumulative fanout of 3 added to the fanout 2 of the previous packet. The other cumulative fanouts are arrived at in a similar fashion.

The data packets are then fed from the adder 28 to a plurality of dummy address encoders (DACs) 30. Each dummy address encoder 30 assigns the copy network outputs on which that packet of data is to appear. For example, as shown in the example of FIG. 2, the first data packet has three copies and thus will appear on copy network outputs 0-2 (0, 1, 2). The next data packet requires two copies which appear on copy network output lines 3 and 4. The next data packet has a single copy which appears on copy network output line 5. Other packets are processed in a similar manner. However, it is interesting to note that the data address encoders 30 reject those data packets which would otherwise exceed the copy network outputs. For the example shown in FIG. 2, the copy network outputs numbers from 0-7. Thus, the last data packet is discarded by the data address encoders 30. The copy network 32 receives the encoded packets of data, replicates them as indicated in their header information, and outputs them on their assigned output lines also as indicated in their header information. Then, each of the copies are input to a plurality of BTCs 34 where their copy numbers are translated into virtual address information. The packets of data are then fed to a plurality of FIFO buffers 35 for presentation in an orderly fashion to the point-to-point switch 36.

As noted above, this prior art circuit design proceeds in a mechanical and simplistic fashion in processing its data packets with no appreciation or consideration given to memory requirements and chip count.

Figure 3:
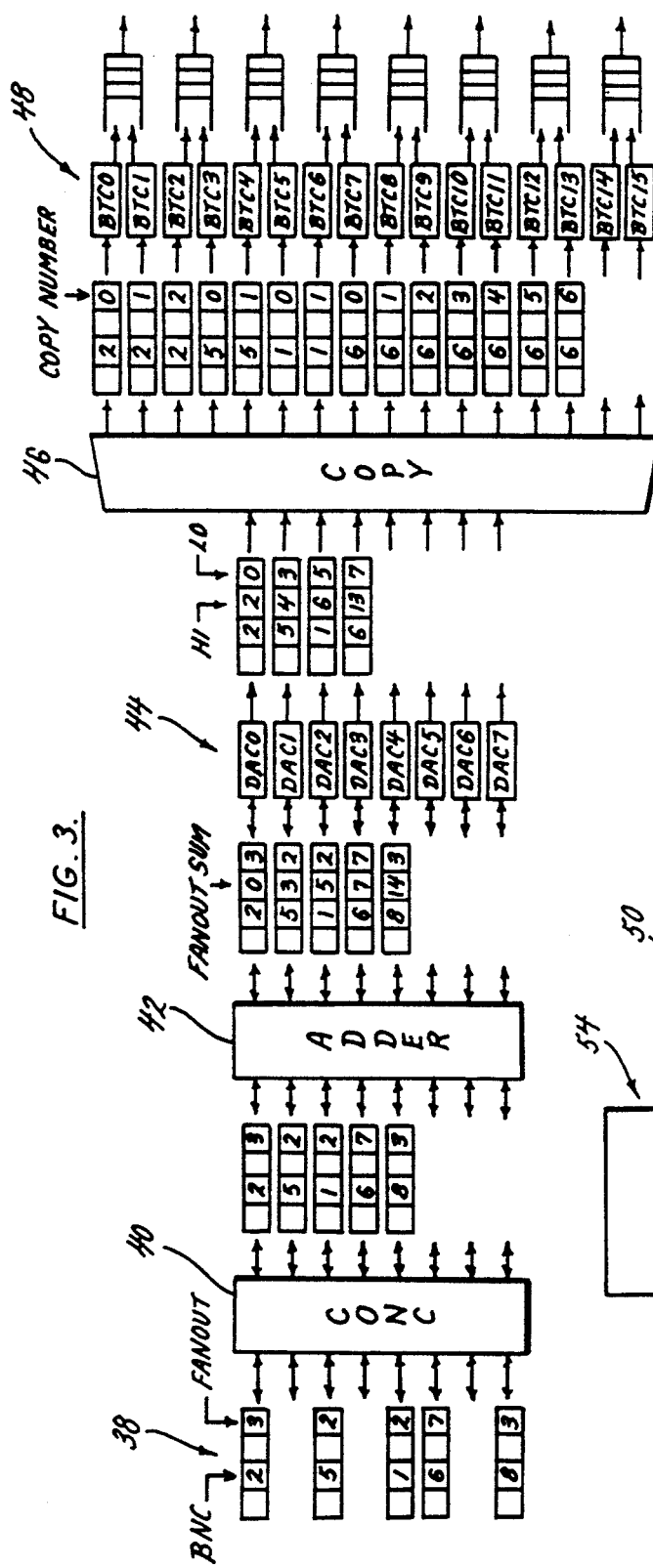
FIG. 3 is a block diagram of the present invention detailing a copy network with expanded output capability.

The implementation of the various improvements disclosed herein are best understood by considering them individually. As shown in FIG. 3, the first concept of expanding the copy network output is explained. As shown in FIG. 3, a similar set of data packets 38 appear at the input to the concentrator network 40 with the exception that the data packet appearing on input number 5 has a fanout of 7 instead of a fanout of 2 as in the example shown in the prior art circuit of FIG. 2. Nevertheless, the concentrator orders the packets on the lower numbered inputs, after which adder 42 creates the cumulative fanout and inserts it in the header of each packet. The DACs 44 proceed as before in assigning copy network outputs to each data packet and discarding those data packets which would exceed the number of copy network outputs. It is at this point where the expanded output of the copy network makes a difference. In the example shown in FIG. 3, the fourth data packet would otherwise have been discarded as it would have exceeded the eight outputs of the prior art copy network 32 shown in FIG. 2. However, with the expanded copy network output 46 of the present invention, the fourth data packet appears on copy network outputs 7–13 and is thusly transmitted through the switch. Also, as we have not yet considered sharing of BTCs, the number of BTCs 48 must be doubled (in this example) in order to accommodate the doubled number of copy network 46 outputs.

Figure 4:
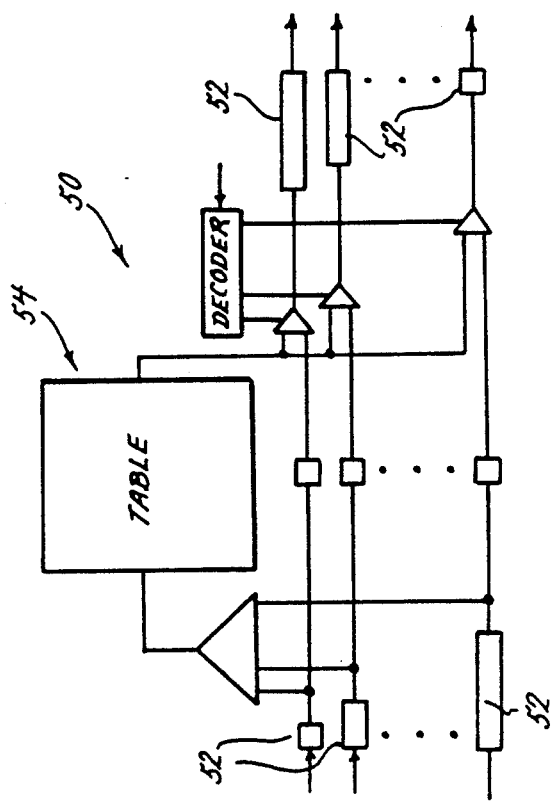
FIG. 4 is a block diagram of a broadcast translator circuit (BTC)
Figure 8:
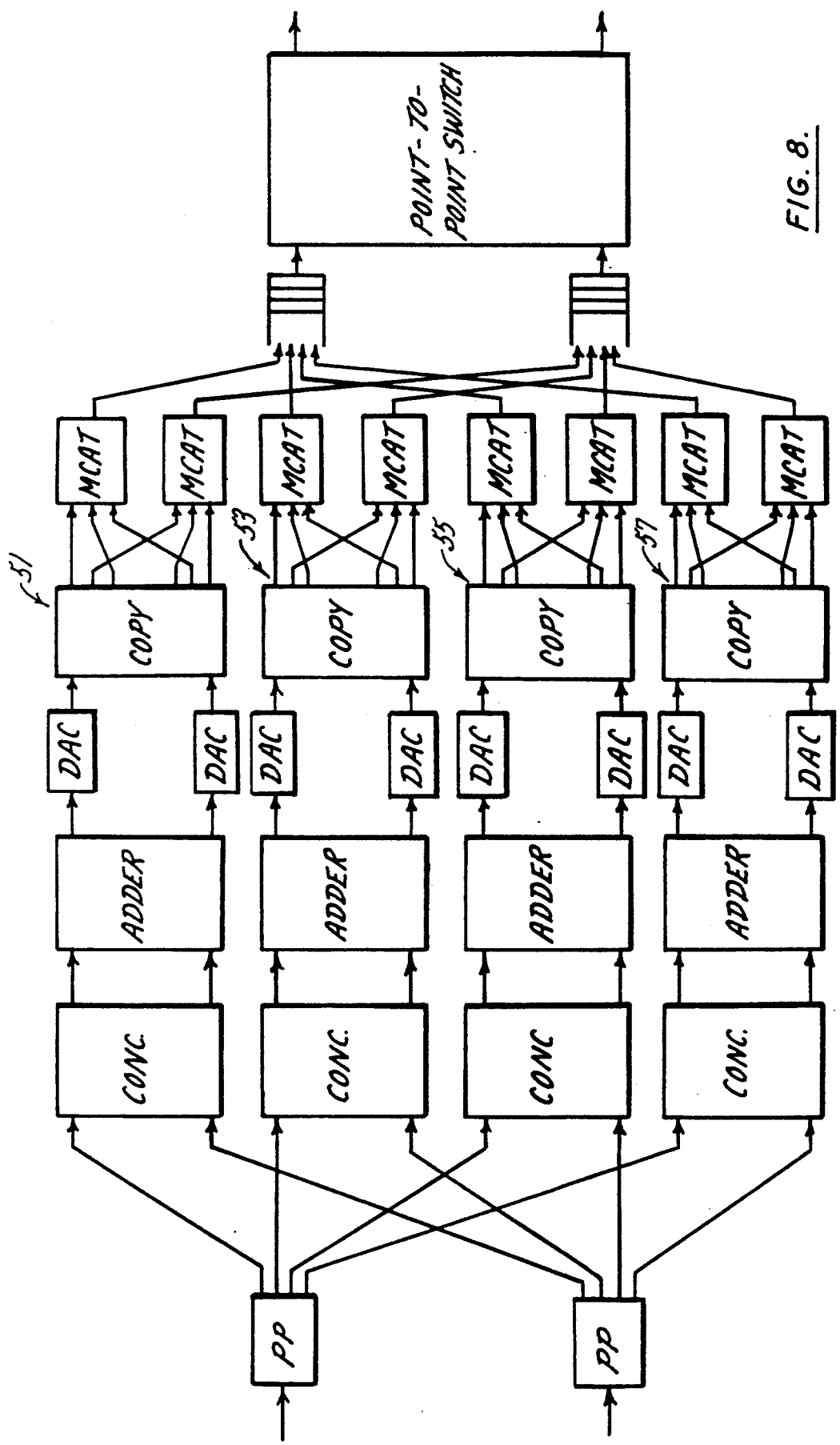
FIG. 8 is a block diagram of a broadcast switch having four parallel switch planes (head ends) including concentrators, adders, and copy networks.

As shown in FIG. 8, four parallel switch planes 51, 53, 55, 57 provide an alternative implementation to the expanded copy network output 46 as shown in FIG. 4. However, the operation and implementation of the invention would be the same.

For an n port system with B broadcast connections and W data bits for each table entry, each BTC requires nWB bits of data in its table 54 and the total memory requirement for the system is nWBN where N is the number of copy network outputs. For the example given herein, where n=256, W=16, B=65K and N=54, each BTC would require 256M bits of data and the total memory requirement would be 64 billion bits. However, this memory requirement can be reduced with two additional improvements. The first of these, and perhaps the easiest to implement, is to recognize that there is sufficient time between data packets to have multiple inputs to a single BTC 50. This is shown in FIG. 4 and is accommodated by the delays 52 at the inputs and outputs to the BTC 50. As shown in FIG. 4, a BTC 50 includes a plurality of delay circuits 52 both at its input and its output in order to serially process the packets for accessing a table 54 containing translation information relating to the virtual address of each packet of data. After serial processing, the data packets are then re-arranged in parallel fashion by the delay networks 52. If each BTC is shared by s copy network output lines, then the number of BTCs is reduced by a factor of s making the total memory requirement nBWN/s. For the examples given herein, and for those data rates and cycle times found in a typical ATM circuit, s may equal 32 so as to reduce the 64 billion bits of memory to 4 billion bits or 16 Mbits for each of the n network inputs.

Figure 5:
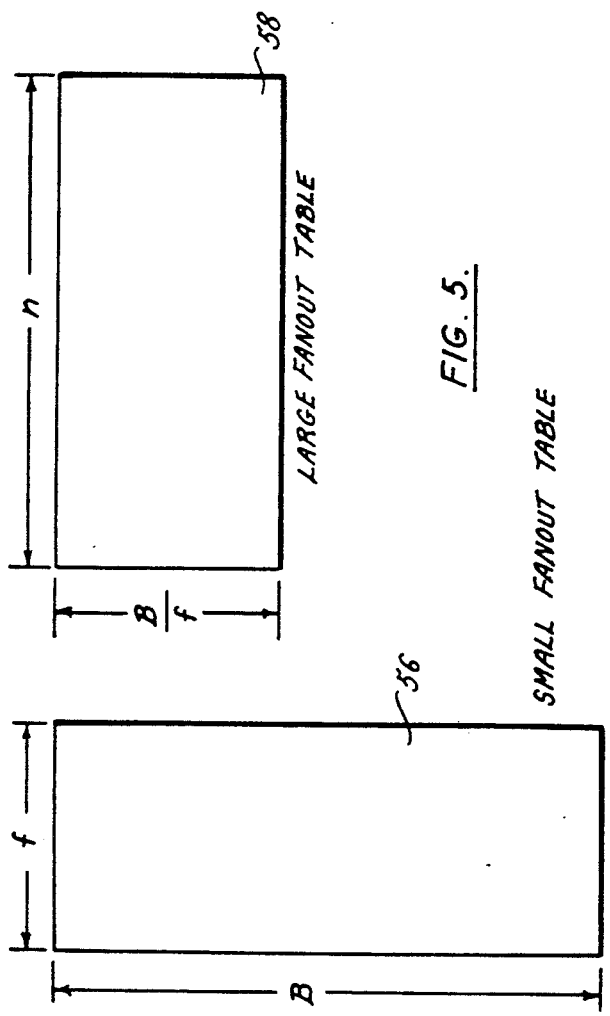
FIG. 5 is a block diagram of the partitioned memory for a BTC.

As shown in FIG. 5, the translation table 54 of BTC 50 in FIG. 4 may be comprised of a partitioned memory having a first partition 56 for packets having fanouts of critical fanout fl or less and a second partition 58 having fanouts as large as n. As mentioned, partitioned tables 56, 58 together comprise the memory requirements of a single BTC. This can be readily understood by remembering that the broadcast switch has a limited number of inputs and outputs such that its data handling capabilities for packets of data with large packets of data is less than that for data packets having smaller fanouts which individually use up less of the input/output capability and therefore can result in a greater number being transmitted in any one cycle. When partitioned in this manner, the BTC memory requirement is reduced by a factor of $nf_1/(n+f_1^2)$ and, other considerations aside, minimal BTC memory may be achieved with $f_1=\sqrt{n}$.

Figure 6:
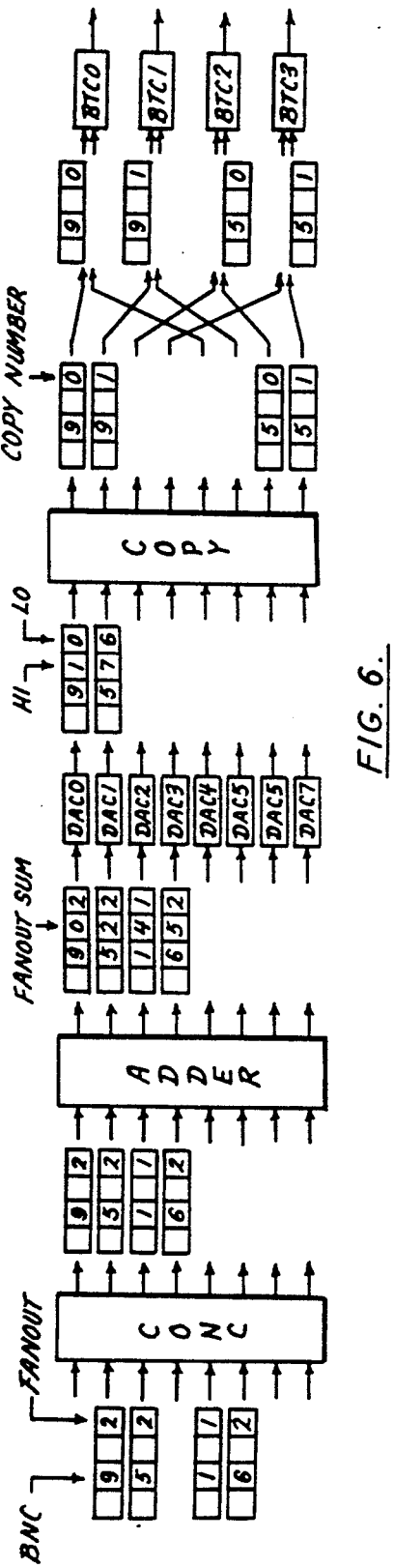
FIG. 6 is a block diagram of a broadcast switch exemplifying the fanout aligned addressing feature of the present invention.
Figure 7:
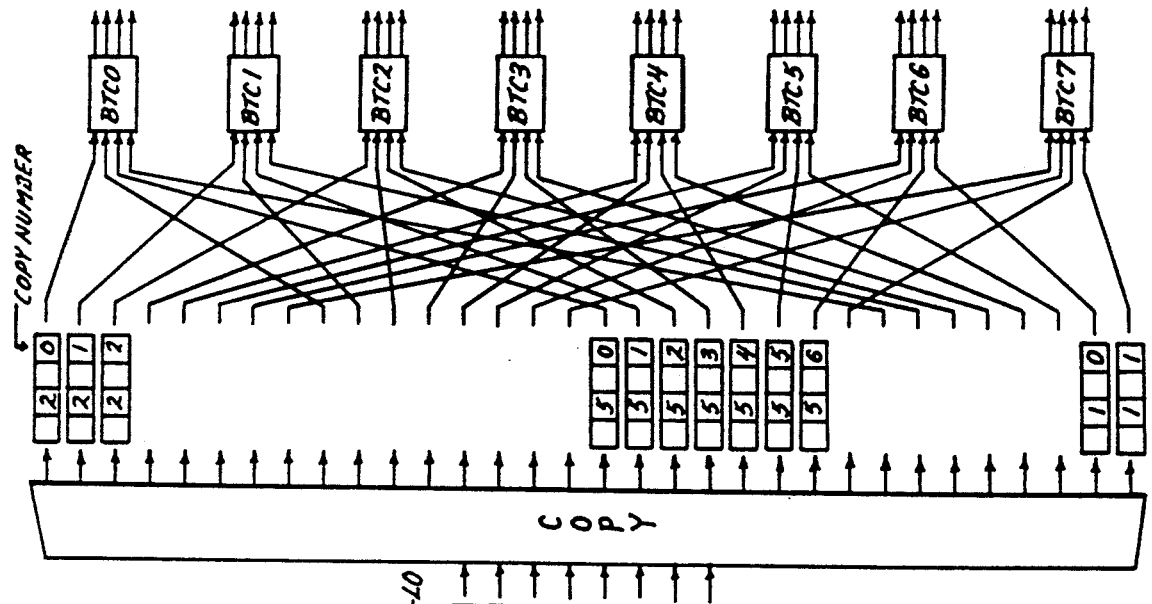
FIG. 7 is a block diagram of the present invention exemplifying a copy network with an expanded output and sharing of those outputs amongst the BTCs.
Figure 7:
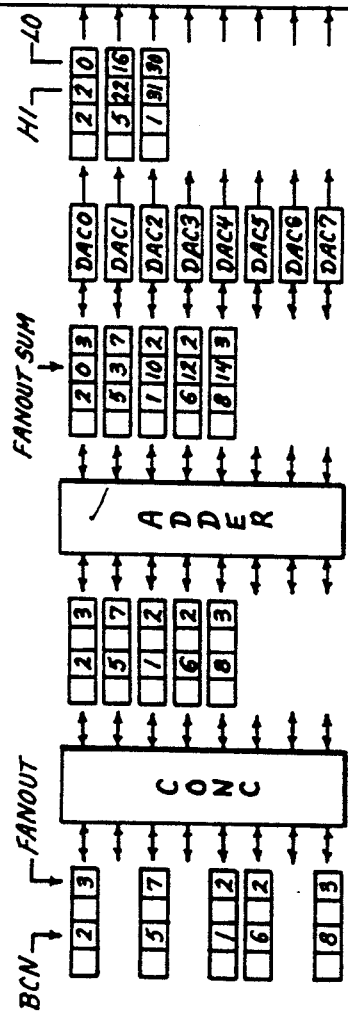

Lastly, still another improvement has been developed for decreasing the memory requirements for the BTCs as is exemplified in FIGS. 6 and 7. As shown therein, this improvement is achieved by modifying the DACs such that replicated copies of packets are assigned to particular copy network outputs in a scheme other than merely placing them on adjacent outputs. In essence, the scheme of the present invention involves placing the first copy (copy 0) of a fanout f packet to a copy network output that is divisible by the smallest power of 2 that is $\geq f$, with remaining copies of the packet being assigned to the next higher consecutive copy network outputs. In application, and by way of example, let f be the fanout of a data packet received by a DAC and F be the cumulative fanout. The DAC first computes Z as the smallest multiple of $2^{**}[\log_2 f]$ that is greater than or equal to 3F. ($[\log_2 f]$ is being used to designate the smallest integer which is $\geq \log_2 f$.) This data packet is accepted for transmission if $Z+f$ is $\leq N$. Then copy network outputs are assigned for that data packet of Z to $Z+f-1$. For example, as shown in FIG. 6, the second data packet has a cumulative fanout of 2 and a fanout of 2 as well. The smallest power of 2 that is $>f$ is 2, and the smallest multiple of 2 that is $\geq 3 \times 2$ (e.g. Z) is 6. Thus, the second data packet is sent to copy network outputs 6 and 7.

Still another example is given in FIG. 7. As shown therein, the second data packet has a cumulative fanout F of 3 and a fanout f of 7. Using our methodology, the smallest multiple of 8 (the next power of 2 which is $\geq 7$) which is $\geq 3 \times 3$ is 16. Hence, the seven copies of the next data packet are aligned on copy network outputs 16–22, as shown in FIG. 7. With regard to the third data packet, the cumulative fanout F is 10 and the packet fanout f is 2. The smallest multiple of 2 which is $\geq 3 \times F$ is 30. Hence, the two copies of the third data packet are aligned on copy network outputs 30 and 31, as shown in FIG. 7. By aligning the packets using the methodology shown herein, data packets having the same copy numbers are routed to only a selected few BTCs. For example, as shown in FIG. 7, the data packets having copy number 0 for the first two data packets are routed to BTC 0, data packets having copy number 1 are routed to BTC 1, and data packets having copy number 2 are routed to BTC 2. Thusly, by aligning the fanouts along particular copy network outputs in accordance with the disclosed invention, the translation information for a reduced number of copy numbers need be stored in each BTC. In our example given herein, if critical fanout $f_1$ is chosen as equal to N/s, and N=6n, the overall memory requirement per input may be reduced to about 216K bits per input.

In summary, the following table reflects the savings achieved by each of the various facets of the present invention.

COMPARISON OF VARIANTS WITH PRIOR ART ARCHITECTURE n: number of network inputs
N: number of copy network outputs
B: number of broadcast connections
W: number of bits per BTC entry
X: copy net cost in prior art architecture
$f_1$: critical fanout
s: sharing parameter

| | Copy Net Cost | Worst-Case Through-Put | # of bits of Memory Per Input | Example n = 256 B = $2^{16}$ w = $2^4$ s = 32 |
|---|---|---|---|---|
| a) Prior Art | x | 1 | nBW | $2^{28}$ = 256 Mbits |
| b) nx2n copy net | 2x | n | 2nBW | $2^{29}$ = 512 Mbits |
| c) BTC sharing (s-way sharing) | 2x | n | 2nBW/s | $2^{24}$ = 16 Mbits |
| d) BCN space partitioning ($f_1 = \sqrt{n}$) | 2x | n | $4\sqrt{n}$BW/s | $2^{21}$ = 2 Mbits |
| e) Fanout alignment $f_1$ = N/s N = 6n | 7x | n | 6BW(1/s + 1/6n[s/6])* | $27 \cdot 2^{13}$ = 216 Kbits |

*see note on page 11 explaining use of brackets [ ].

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a packet switch for replicating and routing packets of data between a plurality n of inputs and a plurality n of outputs, n being a positive integer, said packet switch operating in cycles, wherein in each cycle a set of packets is input and a subset of these packets is replicated and the copies output, the improvement comprising means for replicating the packets, said replicating means including a copy network connected between said switch inputs and switch outputs, said copy network having means for replicating said packets in accordance with a specified number of copies f, defined as the fanout of the packet, tagging each packet with a copy number, and transmitting said replicated, tagged copies through a number of copy network outputs, said copy network having at least a number of outputs greater than n.

2. The packet switch of claim 1 wherein said replicating means includes a plurality of at least n broadcast translation circuits (BTC) connected between the outputs of said copy network and said switch outputs, said BTCs having means for decoding said copy number tags to thereby determine a packet's ultimate destination.

3. The packet switch of claim 2 wherein said copy network has N outputs and wherein each of said BTC's is connected to a plurality s of said N copy network outputs, said plurality of BTC's being equal to a number obtained by dividing N by s.

4. The packet switch of claim 3 wherein each BTC has means for converting the plurality of s data packets for sequentially translating them and means for reconverting the data packets for simultaneous outputs therefrom.

5. The packet switch of claim 4 wherein each of said BTCs is connected to copy network outputs N/s apart.

6. The packet switch of claim 2 wherein each BTC has a memory, said memory having two sets of entries, a first set of entries corresponding to those packets of data having a fanout $\leq f_1$ and a second set of entries corresponding to those packets of data having a fanout of $> f_1$, $f_1$ being a positive integer and thereby defined as a critical fanout for characterizing said two sets of entries.

7. The packet switch of claim 6 wherein said first set of entries represents a matrix of $B \times f_1$ entries where B is defined as the total number of packet switch connections with fanout greater than one and $f_1$ equals a preselected critical fanout, and said second set of entries represents a matrix of $(B/f_1) \times n$ entries, where n is defined as the number of packet switch inputs or outputs.

8. The packet switch of claim 4 further comprising means for aligning the replicated, tagged copies of data packets with selected copy network outputs.

9. The packet switch of claim 8 wherein the copy network inputs and outputs are numbered and wherein the alignment means includes means for aligning the first copy of each group of copies produced from a common original packet with the particular numbered copy network output having an umber divisible by the next higher power of 2 greater than or equal to the original packet's fanout f, and wherein the copy network output number is also greater than or equal to 3F, where F is the cumulative fanout of the data packets appearing at lower-numbered copy network inputs.

10. A method for implementing broadcasting in a packet switch which processes a maximum plurality n of incoming data packets along a plurality of numbered data paths in an ATM circuit, n being a positive integer, each of said data packets having a header which contains at least a fanout f, f being a positive integer, said method comprising the steps of:

concentrating the data packets along consecutive, lowest numbered data paths, computing, for each data packet, the cumulative fanout F for all data packets being processed along lower numbered data paths and inserting F in each data packet header, determining which data packets can be transmitted through said packet switch without exceeding its capacity and discarding all other data packets in the same cycle, assigning copy network outputs to each data packet, replicating each data packet f times with a copy network, assigning systematically determined copy numbers and copy network outputs to each of said replicated data packets, said copy network outputs exceeding n in number, and sending multiple copies of replicated data packets to a single output buffer.

11. The method of claim 10 wherein the step of assigning replicated data packets includes the step of aligning the replicated data packets with particular copy network outputs that are not necessarily consecutive.

12. The method of claim 11 wherein the copy network inputs and outputs are numbered and wherein the step of aligning includes the step of aligning the first copy of each group of packets produced form a common original packet with the numbered copy network output having a number divisible by the next higher power of 2 greater than or equal to the original packet's fanout f, and which is also greater than or equal to 3F, where F is the cumulative fanout of the data packets appearing at lower-numbered copy network inputs.

13. The method of claim 10 wherein the broadcast packet switch includes a plurality of broadcast translation circuits BTC's, each of said BTC's having a memory for storing translation information, and the step of translating includes the step of first determining whether the fanout f of each data packet is greater than, less than, or equal to a critical fanout $f_1$ before each of said BTC memories is accessed for translation information.

14. The method of claim 10 wherein the step of sending includes the step of sending replicated data packets to a single broadcast translator circuit.

15. The method of claim 14 further comprising the step of translating each data packet by its copy number to determine its virtual address.

16. The method of claim 15 wherein the step of translating the copy numbers of each data packet comprises the step of translating a plurality s of data packet copy numbers during each cycle, s being a positive integer.

17. In a packet switch for replicating and routing packets of data between a plurality n of inputs and a plurality n of outputs, n being a positive integer, said packet switch operating in cycles, wherein in each cycle a set of packets is input and a subset of these packets is replicated and the copies output, the improvement comprising means for implementing broadcasting, said broadcasting means including a copy network having at least a plurality n of inputs and a number of outputs greater than n to ensure that the number of copies output is greater than or equal to n, or the total number of copies replicated, whichever is smaller.

18. The packet switch of claim 17 wherein said broadcasting means includes a plurality of broadcast translation circuits BTC's, said BTC's being connected to the copy network outputs and having means for translating information contained in each data packet into a virtual address, each BTC being connected to a plurality s of copy network outputs and having means for processing a plurality s of data packets in one cycle.

19. The packet switch of claim 18 wherein said data packet processing means includes means for sequencing said plurality s of data packets into a serial data stream and means for realigning said data stream after its translation by each of said BTC's for parallel output.

20. The packet switch of claim 19 wherein each BTC has a memory, said memory having two sets of entries, a first set of entries corresponding to those packets of data having a fanout $\leq$ a fanout $f_1$ and a second set of entries corresponding to those packets of data having a fanout of $>f_1$, $f_1$ being a positive integer and defined as the critical fanout.

21. The packet switch of claim 20 wherein said first set of entries represents a matrix of $B \times f_1$ where B is defined as the total number of packet switch connections with fanout greater than one and $f_1$ equals a preselected critical fanout, and said second set of entries represents a matrix $(B/f_1) \times n$, where n is defined as the number of packet switch inputs or outputs.

22. The packet switch of claim 17 wherein said copy network has means for replicating each data packet in accordance with each data packet's fanout f, f being a positive integer, and tagging each of said data packets with a copy number representative of its ultimate destination, and further comprising means for aligning the replicated data packets with their copy numbers along selected copy network outputs.

23. The packet switch of claim 22 wherein the copy network inputs and outputs are each numbered and wherein the alignment means includes means for aligning the first copy of each group of packets produced from a common original packet with the numbered copy network output having a number divisible by the next higher power of 2 grater than or equal to the original packet's fanout f, and which is also greater than or equal to 3F, where F is the cumulative fanout of the data packets appearing at lower numbered copy network inputs.

24. In a packet switch for replicating and routing packets of data between a plurality n of inputs and a plurality n of outputs, n being a positive integer, the improvement comprising means for implementing broadcasting in said packet switch, said broadcasting means including a plurality of copy networks connected between said plurality of inputs and plurality of outputs, said copy networks having means for replicating data packets, said plurality of copy networks having a sum total of copy network outputs greater than n.

25. The packet switch of claim 24 wherein the broadcasting means includes a plurality of parallel switch planes for processing data packets, each of said switch planes having a plurality of stages mirroring the other of said switch planes, and means for dividing incoming data packets amongst said parallel switch planes.

* * * * *